United States Patent
Svara et al.

(10) Patent No.: US 10,718,146 B2
(45) Date of Patent: Jul. 21, 2020

(54) DAMPER ASSEMBLY FOR A HINGE

(71) Applicant: Titus d.o.o. Dekani, Dekani (SI)

(72) Inventors: Valter Svara, Izola (SI); Danijel Kozlovic, Dekani (SI); David Pecar, Pobegi (SI)

(73) Assignee: Titus d.o.o.Dekani, Dekani (SI)

( * ) Notice: Subject to any disclaimer, the term of this patent is extended or adjusted under 35 U.S.C. 154(b) by 141 days.

(21) Appl. No.: 14/653,504

(22) PCT Filed: Dec. 17, 2013

(86) PCT No.: PCT/EP2013/076999
§ 371 (c)(1),
(2) Date: Jun. 18, 2015

(87) PCT Pub. No.: WO2014/095939
PCT Pub. Date: Jun. 26, 2014

(65) Prior Publication Data
US 2017/0175430 A1   Jun. 22, 2017

(30) Foreign Application Priority Data
Dec. 18, 2012 (GB) .................................. 1222822.7

(51) Int. Cl.
*E05F 5/00* (2017.01)
*F16F 9/19* (2006.01)

(52) U.S. Cl.
CPC ............... *E05F 5/006* (2013.01); *F16F 9/19* (2013.01); *E05Y 2201/21* (2013.01); *E05Y 2201/232* (2013.01); *E05Y 2201/264* (2013.01); *E05Y 2201/624* (2013.01); *E05Y 2900/20* (2013.01)

(58) Field of Classification Search
CPC .. E05Y 2201/21; E05Y 2900/21; E05F 5/006; Y10T 16/5383; Y10T 16/2771; Y10T 16/304
See application file for complete search history.

(56) References Cited

U.S. PATENT DOCUMENTS 3,741,867 A * 6/1973 Fortescue ................ G21C 7/14
188/129
4,537,482 A * 8/1985 Weiner ..................... G03B 1/24
226/143

(Continued)

FOREIGN PATENT DOCUMENTS

GB           2469847 A       11/2010

*Primary Examiner* — Victor D Batson
*Assistant Examiner* — Matthew J Sullivan
(74) *Attorney, Agent, or Firm* — Alan D. Kamrath; Karin L. Williams; Mayer & Williams PC

(57) ABSTRACT

A damper assembly for a hinge includes a damper unit (10) with a piston arranged to be moveable over a working stroke within a cylinder (15) containing damping fluid. The damper unit (10) is mounted on a bracket (11) and retained in position by a housing (12). A mechanism is provided for converting rotational movement of the hinge in at least part of one direction into actuation of the damper unit (10) on its working stroke. The movement converting mechanism is arranged to act on the cylinder (15) at a position substantially outside the range of movement of the piston on its working stroke. The arrangement minimises the transmission of radial forces from the movement of the door to the cylinder (15).

7 Claims, 2 Drawing Sheets

(56) References Cited

U.S. PATENT DOCUMENTS

| | | | |
|---|---|---|---|
| 7,065,833 B2* | 6/2006 | Kropf | E05D 3/142 |
| | | | 16/286 |
| 7,748,082 B2 | 7/2010 | Harald et al. | |
| 8,186,014 B2* | 5/2012 | Pecar | E05D 3/142 |
| | | | 16/286 |
| 8,640,305 B2* | 2/2014 | Pecar | E05F 5/006 |
| | | | 16/50 |
| 9,414,724 B2* | 8/2016 | Vallance | A47K 13/12 |
| 9,879,462 B2* | 1/2018 | Svara | E05F 5/006 |
| 2009/0119875 A1 | 5/2009 | Migli | |
| 2017/0022744 A1* | 1/2017 | Migli | E05F 5/006 |
| 2017/0096849 A1* | 4/2017 | Kruedener | E05F 5/006 |

\* cited by examiner

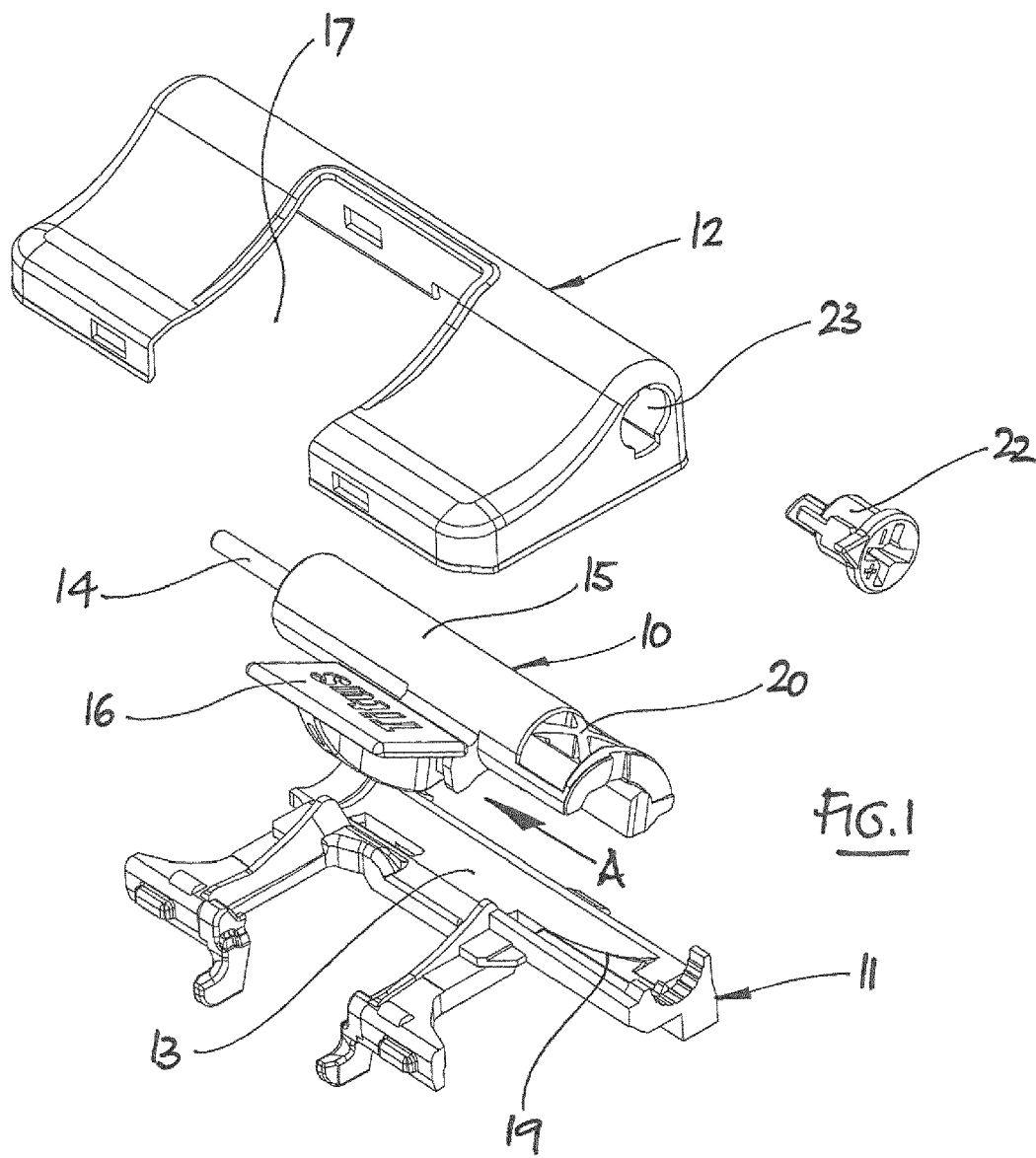
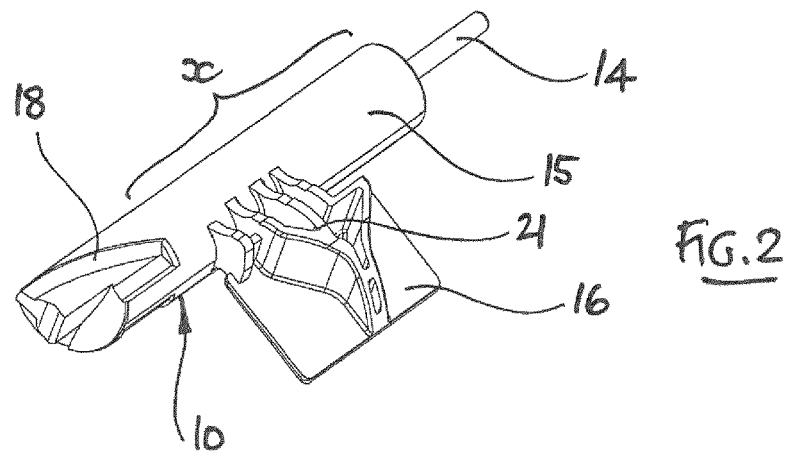

DAMPER ASSEMBLY FOR A HINGE

This invention relates to damper assemblies and, more particularly, to damper assemblies for use with toggle type hinges of the sort that are typically used on kitchen cupboards.

The invention provides a damper assembly for a hinge, with the damper assembly comprising a damping device with a piston arranged to be moveable over a working stroke within a cylinder containing damping fluid, retaining means for mounting the damping device, and a mechanism for converting rotational movement of the hinge in at least part of one direction into relative movement of the piston and cylinder on the working stroke of the piston. The movement converting mechanism is arranged to act on the cylinder at a position substantially outside the range of movement of the piston on its working stroke.

Figure 3:
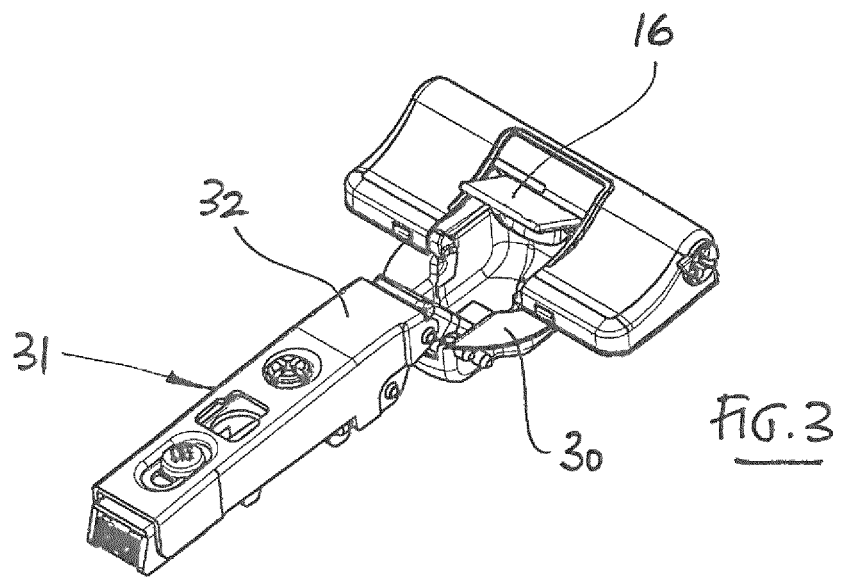
Figure 4:
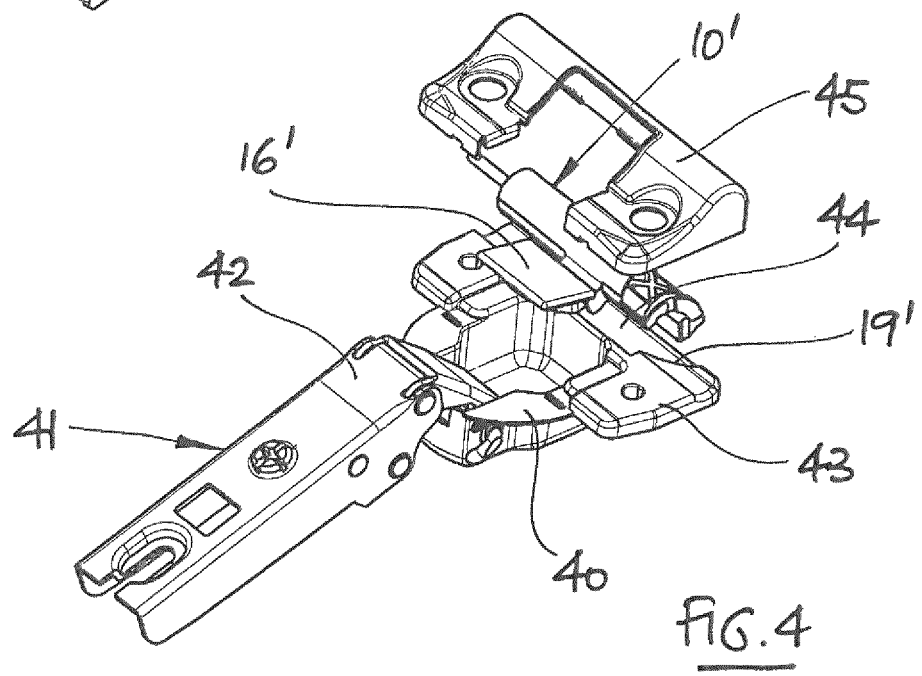

By way of example, embodiments of the invention will now be described with reference to the accompanying drawings, in which:

FIG. 1 is an exploded view showing the components of a first form of a damper assembly according to the invention, FIG. 2 is an underneath view of the damper unit of the damper assembly of FIG. 1, FIG. 3 shows the damper assembly of FIG. 1 in position on a hinge, and FIG. 4 is an exploded view showing the components of a second form of a damper assembly for a hinge.

The form of a damper assembly seen in the exploded view in FIG. 1 is for mounting onto the hinge cup 30 of a toggle type hinge 31 (see FIG. 3) of the sort that is typically used for mounting a door on a kitchen cupboard. Such hinge and damper assemblies are known in the art, and an example is seen in U.S. Pat. No. 8,186,014.

As seen in FIG. 1, the damper assembly comprises a damper unit 10, which in use is mounted on a bracket 11 and retained in position by a housing 12.

The damper unit 10 is in the form of a linear piston and cylinder device, with a piston (not shown) arranged on the end of a piston rod 14 to be reciprocable within a cylinder 15 containing a damping fluid such as silicone, and with a compression spring (not shown) biasing the piston rod towards its extended position. The device is designed to produce a damped resistive force upon its compression, in known manner.

The damper unit 10 is mounted on the bracket 11 via an elongate, radiussed groove 13. This enables the damper unit 10 to have freedom to rotate about its longitudinal axis and to have freedom to move axially with respect to the bracket 11. The housing 12 is attachable to the bracket 11 by suitable means such as fasteners or spring clips and thereby retains the damper unit 10. The bracket 11 is itself attachable to the cup flange of the hinge by suitable means such as fasteners or spring clips, in known manner.

Extending laterally from the cylinder 15 is a wing 16, which in use protrudes out of an opening 17 in the housing 12. The wing 16 is designed to be engageable by part of the link mechanism 32 of the toggle type hinge 31 (see FIG. 3) and thereby actuates the damper assembly on the closing movement of the door that it mounts. A reinforcing structure 21 is provided beneath the wing 16 (seen best in FIG. 2) to strengthen its attachment to the cylinder 15.

As seen best in FIG. 2, the cylinder 15 is provided with a camming surface 18 which extends helically around its outer surface. This camming surface 18 is designed to be engageable with a complimentary camming surface 19 provided in the groove 13 on the bracket 11. The two camming surfaces 18, 19 cooperate together to form a movement converting mechanism that acts to translate rotational movement of the cylinder 15 (caused by actuation of the wing 16) into axial movement of the cylinder. In particular, the cylinder 15 is caused to move axially towards the free end of the piston rod 14 (in the direction of arrow A in FIG. 1) upon closing movement of the door. Since the free end of the piston rod 14 abuts against the inside of the housing 12, this movement of the cylinder 15 causes compression of the damper unit 10. The damper unit 10 thus generates in return a damped resistive force, which is transmitted via the wing 16 and the hinge to the closing door, thus retarding its closing movement.

An end cap 22 is mounted in a hole 23 in the housing 12. The purpose of the end cap 22 is to allow adjustment of the axial position of the cylinder 15. This enables the pre-load on the damper device 10 to be tailored to suit the door/cupboard on which it is mounted.

To be fully useful, a damper assembly such as this must be capable of withstanding the forces generated by a slammed door. The helical profile of camming surfaces 18, 19 means that in addition to generating an axial component of force, the movement converting mechanism will also generate a radial component of force. When the door is slammed, the impact on the actuating wing 16 will be unusually high. This in turn means that an unusually high degree of radial force will be transmitted to the damper unit 10. In some cases, the radial force component can be sufficient to lead to distortion of the cylinder 15, potentially jamming the piston within it, or even to a fatal fracture of the cylinder.

It will be noted that in the assembly seen in the drawings, the movement converting mechanism is located at the end of the cylinder 15. In this position, the radial component of force generated by the slamming of a door will have a least effect on the integrity of the cylinder 15. Moreover, the camming surface 18 is positioned on the cylinder 15 beyond the extent of the working stroke of the piston (indicated by the letter x in FIG. 2). This ensures that the cylinder 15 will experience minimal distortion over the effective working of the range of the piston, thereby reducing the risk of jamming.

A further feature of the assembly seen in the drawings is that the damper unit 10 incorporates a buffer zone 20. The buffer zone 20 is situated in the path of the force transmitted between the movement converting mechanism and the damper unit 10. The buffer zone 20 takes the form of a structure that is designed to be resiliently collapsible in the direction of the longitudinal axis of the damper unit 10 when subjected to an impact load. The purpose of the buffer zone 20 is to suffer a controlled collapse under the high initial impact of a slammed door, thus helping to dissipate the force transmitted to the damper unit 10. The buffer zone 20 is suitably designed for this purpose, e.g. with a honeycomb structure as seen in FIG. 1, and/or from the material from which it is made. In the latter case, if the cylinder is made of plastics material, for example, it may be possible to arrange for the buffer zone to be made integrally, but of a softer, more resilient material than the rest of the cylinder.

It will be appreciated that it would be possible to incorporate the feature of the buffer zone in the other forms, for example, as part of the piston rod perhaps, or as part of the housing or some other part against which the damper unit may be designed to act.

The form of damper assembly seen in exploded view in FIG. 4 is also for mounting onto the hinge cup 40 of a toggle type hinge 41 of the sort that is typically used for mounting a door on a kitchen cupboard. Again, the wing 16' of the damper unit 10' is arranged to be engaged by part of the link mechanism 42 of the hinge 41 to thereby actuate the damper assembly upon the closing movement of the door that it mounts.

The damper unit 10' here is essentially the same as the damper unit 10 seen in FIGS. 1 and 2. In this case, however, the damper unit 10' is mounted directly onto the hinge cup flange 43 itself. The damper unit 10' is mounted via a radiussed groove 44 on the hinge cup flange 43. This enables the damper unit 10' to have freedom to rotate about its longitudinal axis and to have freedom to move axially with respect to the hinge cup flange 43. The damper unit 10' is retained in position by of a housing 45, which is attachable to the hinge cup flange 43 by suitable means such as fasteners or spring clips, in known manner. In this case, the helical camming surface 19' which forms part of the movement converting mechanism is formed as an integral feature of the hinge cup flange 43. In all other respects, the damper assembly of FIG. 4 operates in the same manner as the damper assembly of FIGS. 1, 2 and 3.

It will be appreciated that other arrangements for mounting the damper unit and configuring the movement converting mechanism are possible, for example by forming one of the camming surfaces on the housing or on some other component to be attached to the housing and/or the hinge cup flange, or by arranging for the movement converting mechanism to act on the piston rod instead of or in addition to the cylinder.

The invention claimed is:

1. A damper assembly for a hinge comprising:
 a damping device having an elongate cylinder with a longitudinal axis and containing damping fluid and a piston, wherein the piston is arranged to be linearly moveable relative to the elongate cylinder with respect to the longitudinal axis and within a range of linear movement over a working stroke between axially spaced apart end positions along the longitudinal axis and within the elongate cylinder,
 retaining means for mounting the damping device relative to the hinge in use, and
 a movement converting mechanism for converting rotational movement of the hinge in one direction over at least part of a range of rotational movement into relative linear movement of the piston and the elongate cylinder on the working stroke of the piston,
 wherein said rotational movement of the hinge is arranged to cause rotational movement of the damping device about said longitudinal axis, and
 wherein the movement converting mechanism is arranged to act between the damping device and the retaining means,
 with the movement converting mechanism acting to transmit force to the elongate cylinder at an axial position relative to the longitudinal axis substantially outside the range of relative linear movement of the piston on the working stroke between the axially spaced apart end positions along the longitudinal axis, wherein the working stroke is within the elongate cylinder to minimize distortion of the elongate cylinder over the effective working range of the piston when force is transmitted to the elongate cylinder by the movement converting mechanism; and
 wherein the elongate cylinder comprises a buffer zone at an end of the elongate cylinder, wherein the buffer zone is a collapsible structure interposed in a line of force transmitted to the damping device that dissipates the force transmitted to the damper device.

2. A damper assembly as claimed in claim 1, wherein the movement converting mechanism includes a camming surface positioned on the elongate cylinder beyond the extent of the working stroke of the piston, and positioned on the other side of the buffer zone at the same end of the elongate cylinder.

3. A damper assembly as claimed in claim 1, wherein the collapsible structure is a collapsible honeycomb structure.

4. A damper assembly as claimed in claim 1, wherein the working stroke of the piston is a compression of the damping device.

5. A damper assembly as claimed in claim 1, wherein the piston is mounted on a piston rod that has a free end extending out of the elongate cylinder.

6. A hinge assembly comprising a hinge and a damper assembly as claimed in claim 1.

7. A piece of furniture comprising a damper assembly as claimed in claim 1.

* * * * *